No. 869,309. PATENTED OCT. 29, 1907.
W. A. KRAMER.
AUTOMATIC STOP GAGE ATTACHMENT.
APPLICATION FILED JUNE 14, 1906.
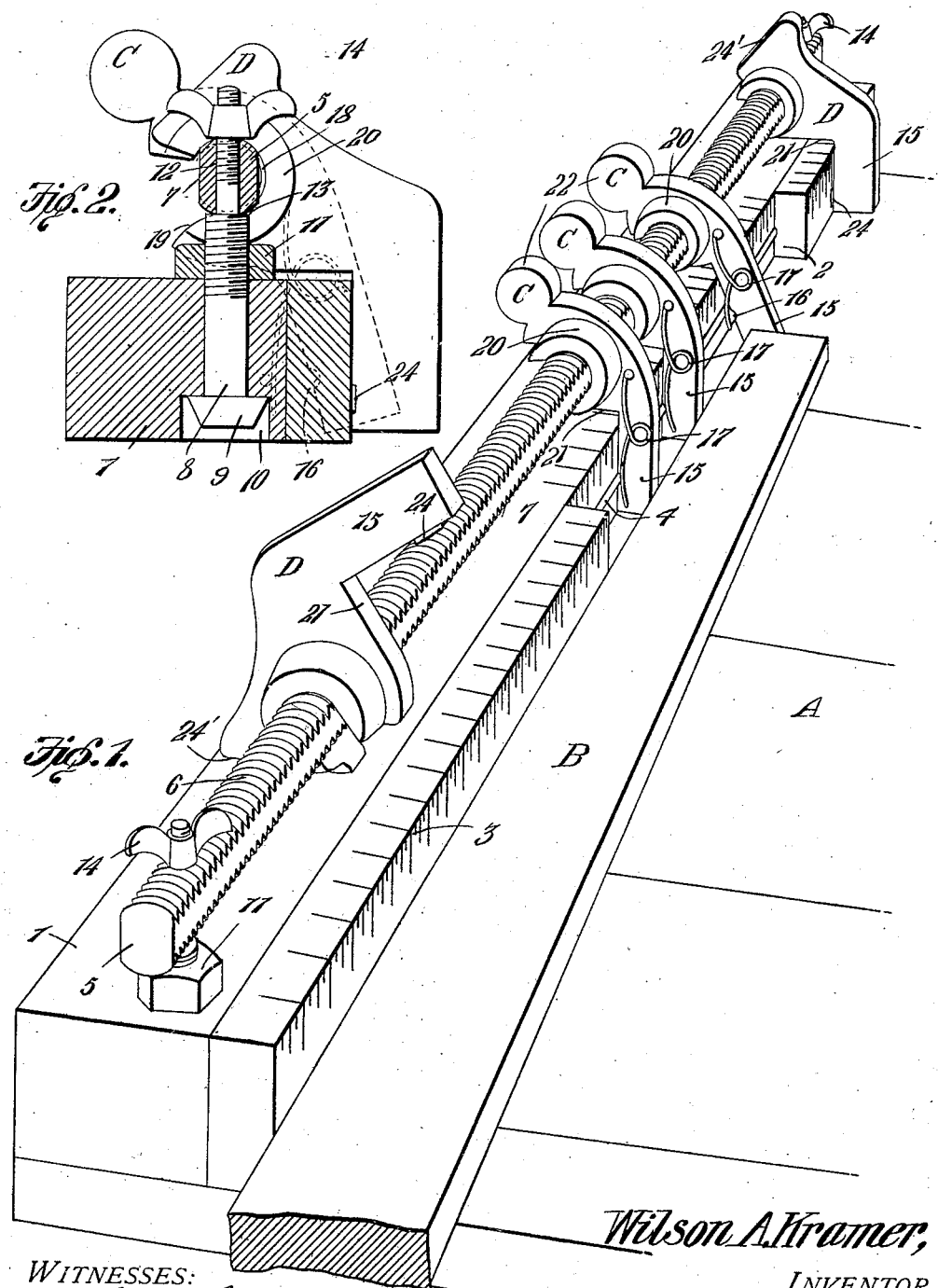
WITNESSES:
Wilson A. Kramer,
INVENTOR.
By C. A. Snow & Co.
ATTORNEYS

UNITED STATES PATENT OFFICE.

WILSON A. KRAMER, OF BLOOMSBURG, PENNSYLVANIA.

AUTOMATIC STOP-GAGE ATTACHMENT.

No. 869,309.   Specification of Letters Patent.   Patented Oct. 29, 1907.

Application filed June 14, 1906. Serial No. 321,730.

*To all whom it may concern:*

Be it known that I, WILSON A. KRAMER, a citizen of the United States, residing at Bloomsburg, in the county of Columbia and State of Pennsylvania, have invented a new and useful Automatic Stop-Gage Attachment, of which the following is a specification.

This invention relates to an automatic stop gage attachment for buzz, or cut-off saws and the like.

The object of the invention is to provide a simple and improved attachment which can be used for measuring lumber in different lengths so as to permit it to be easily and quickly cut with a cross-cut saw.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of the following claims without departing from the spirit of the invention or sacrificing any of its advantages.

In the accompanying drawings forming a part of this specification: Figure 1 is a perspective view of the improved stop gage attachment in position upon a cross-cut saw table. Fig. 2 is a transverse vertical section thereof.

Like reference numerals indicate corresponding parts in the different figures of the drawings.

The reference numeral 1 indicates a support which may be of any suitable form and construction. When the improved gage attachment is used for measuring material to be cut in different lengths with a buzz saw, the support 1 will be secured in any suitable manner to the saw table A so as to be in position to have the piece of material B moved or slid along its front face until it is caused to contact with the proper stop, after which the saw is moved into contact with the material to cut it in two. The support 1 preferably is rectangular in shape and is formed in its front face with a vertical slot or channel 2. The support 1 preferably is provided with scale marks or indicating means 3 by the aid of which the stop devices hereinafter described can be properly adjusted. In order to prevent the stops which are located in the channel 2, as hereinafter described, from wearing or scratching said channel so as to abrade or deface the scale marks 3, I provide said channel with a longitudinally extending guard member 4 which preferably consists of a strip of hard metal.

In addition to the support 1, the improved attachment of this invention includes a bar 5 which is formed with a thread 6 and oppositely disposed flat faces 7 which serve to interrupt the thread 6 for the purpose hereinafter described. The front flat face 7 of the bar 5 preferably is arranged approximately in the same vertical plane as the bottom of the channel 2 of the support 1. The bar 5 is connected with the support 1 in any suitable manner. The preferred means for securing the bar 5 to the support 1 comprises a pair of bolts 8 having their integral heads 9 located in suitable sockets 10 in the lower portion of the support 1, the shanks of said bolts projecting up through the upper face of the support 1 and being provided with nuts 11 screwed against the support 1. The upper ends of the bolts 8 are reduced as shown at 12 so as to form shoulders 13. The bar 5 is formed adjacent its ends with suitable transverse perforations into which the reduced ends 12 of the bolts 8 project. The bar 5 is held upon the reduced ends 12 and against the shoulders 13 by wing nuts 14. The construction described constitutes simple and efficient means for securing the bar 5 to the support 1. It will be understood, however, that other supporting means for the bar 5 can be used if desired.

The stops or clamping members which are adjustably mounted upon the bar 5 are indicated generally by C, C, C, and D, D, the stops C being similar in construction and the stop D being slightly different in construction. Each of the stops C preferably comprises an elongated arm 15 which, when the stop is in one position, is adapted to project downward into the channel 2 of the support 1. Each of the arms 15 is formed in its rear surface with a recess or groove 16 which is adapted to fit over or receive the guard member 4 of the channel 2. Each of the arms 15 preferably is provided with a spring 17 which is adapted to bear at its free end against the guard member 4 so as normally to hold the lower end of the arm 15 a slight distance out of the lower end of the channel 2, the spring 17 constituting means for yieldingly holding the arm 15 away from the channel 2. In addition to the arms 15, each of the stops C is provided with a threaded portion 18 having an entrance opening 19. The entrance opening 19 serves to interrupt the threads in the portion 18. The threaded portion 18, in shape, preferably is slightly more than a semicircle, and the walls of the entrance opening 19 preferably diverge outwardly with respect to each other, said walls at their inner ends being separated from each other by a distance about equal to the thickness of the bar 5 between the flat faces 7 thereof.

It will be obvious that when the arms 15 of the stops C are raised to horizontal position, the threaded portion 18 can be readily engaged with or disengaged from the bar 5 so as to change the position of the stops by adjusting them longitudinally upon the bar 5. Adjacent the threaded portion 18, each of the stops C is provided with a threaded reinforcing collar 20 through which the entrance opening 19 extends. The reinforcing collar 20 serves to increase the strength of the stop and also to give it a longer and stronger grip upon the bar 5. Each of the stops C is formed with a shoulder or face 21 which, when the arm 15 is resting in the channel 2 of the support, extends close to the upper face of the support 1 so as to be located in proximity to the scale marks 3 and thus act as a pointer or gage. Each of the stops C is also provided with a projection or handle 22 which can be grasped when it is desired to rotate the stop and thus change its adjustment upon the bar 5.

The stops D are of substantially the same construction as the stops C in all particulars except that the shoulder 21 which serves as a gage or pointer is elongated so as to extend across the upper face of the support 1 at the ends of the channel 2, and the arm 15 is disposed in a plane in advance of the arms 15 of the stops C whereby the arm 15 of each stop D is adapted to extend down the front face of the support 1 at the ends of the channel 2. The arm 15 of each stop D preferably is provided on its rear face with a cushion or pad 24 constructed of rubber or other soft material adapted to bear against the front face of the support so as to constitute means for preventing any scratching thereof. As shown in the drawing, the scale marks 3 preferably extend along the upper face of the support 1 until the channel 2 is reached, when the scale marks are interrupted and continued along the upper face of the support in rear of said channel. The stops D preferably are formed with rear inclined faces 24' which are adapted to bear against the upper surface of the support 1 when the stops D are tilted backward out of operative position, as shown at the left in Fig. 1.

The arms 15 of the stops C preferably are of a width equal to the depth of the channel 2, so that when said arms are pushed backward into said channel by the manipulation of the board B which is to be cut, their front surfaces will be in line with the front surface of the support 1 at the opposite ends of the channel 2. For this reason the board B can be slid or moved along the attachment until it is adjacent the proper stop, after which it can be moved toward the support so as to push backward into the channel 2 all the stops C which are not needed, and the board B can then be caused to abut at its end against the proper stop so as to measure it quickly and permit it to be cut to the proper length, it being understood that the springs 17 permit the rearward yielding of the stops C.

It will be obvious that whenever it is desired to use the improved attachment as a clamp upon a work bench, the stops C and D, or part of them, can be properly adjusted with respect to each other so as to clamp between them any piece of material upon which it is desired to work. In this connection it will be understood that the interrupted threads 6 of the bar 5 are arranged in the usual spiral form, whereby a rough adjustment of the stop or stops can be secured by sliding them along the bar 5 until they are in proximity to the material which is to be clamped. Then when the stop is rotated to lock it in position, the threads 6 cause it to move a slight distance further toward the work or material so as to exercise a clamping action thereon.

It will be obvious from an inspection of the drawings that the elongated arms 15 of the stops C and D, which project down the support 1, by reason of their length and width, serve as gravity-actuated means for locking the stops in adjusted position upon the bar 5, it being apparent that in order to unlock the stops it will be necessary to lift the arms 15 against the action of gravity so as to rotate the stops and permit them to be disengaged from the threads of the bar 5 and moved to a different position.

The attachment of this invention is strong, simple, durable and inexpensive in construction as well as thoroughly efficient in operation.

What is claimed is:

1. A gage comprising a support, a bar mounted thereon, said bar having a long and short diameter with transverse threads upon its surface at the ends of the long diameter, an arm having a threaded opening, the throat of which is less in width than the long diameter of the bar and greater in width than the short diameter of the bar.

2. A gage comprising a support, a bar mounted upon said support and having a long and short diameter, an arm having an opening for the reception of said bar, the throat of said opening being of greater width than the short diameter of the bar and of less width than the long diameter of the bar and a spring attached to said arm and bearing against said support.

3. In a gage, a carrier bar having an interrupted thread and a gage member on the bar, said gage member having a threaded opening and a throat extending laterally from said opening and interrupting the thread thereof.

4. In a gage, a carrier bar having an interrupted thread and a gage member on the carrier bar, said gage member having a threaded perforation and a laterally disposed throat which interrupts the thread of said perforation, a support for the bar and a spring attached to the gage member and bearing against said support.

In testimony that I claim the foregoing as my own, I have hereto affixed my signature in the presence of two witnesses.

WILSON A. KRAMER.

Witnesses:
ROBERT W. GIFT,
W W BLACK.